Figure 1:
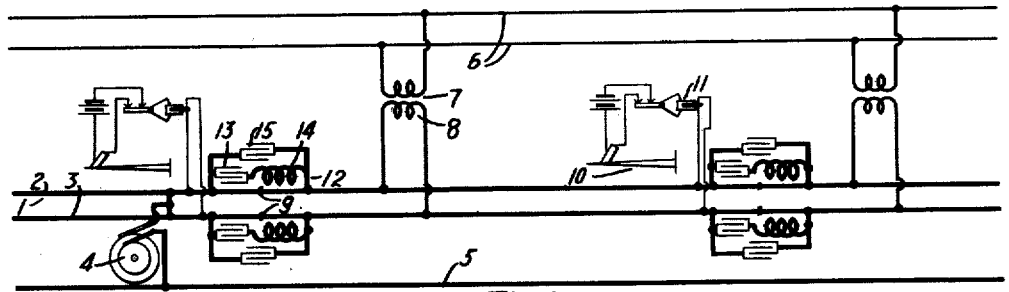

C. LE G. FORTESCUE.
DOUBLE RESONANT CIRCUIT.
APPLICATION FILED NOV. 12, 1915.

1,304,294.

Patented May 20, 1919.
3 SHEETS—SHEET 1.

WITNESSES:
Fred A. Lind
Geo. W. Hansen.

INVENTOR
Charles LeG. Fortescue
BY
Wesley G. Carr
ATTORNEY

C. LE G. FORTESCUE.
DOUBLE RESONANT CIRCUIT.
APPLICATION FILED NOV. 12, 1915.

1,304,294.

Patented May 20, 1919.
3 SHEETS—SHEET 2.

WITNESSES:
Fred A. Lind.
Geo. W. Hansen.

INVENTOR
Charles LeG. Fortescue
BY
Wesley G. Carr
ATTORNEY

C. LE G. FORTESCUE.
DOUBLE RESONANT CIRCUIT.
APPLICATION FILED NOV. 12, 1915.

1,304,294.

Patented May 20, 1919.
3 SHEETS—SHEET 3.

WITNESSES
Fred A Lind.
Geo. W. Hansen.

INVENTOR
Charles LeG. Fortescue
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

DOUBLE RESONANT CIRCUIT.

1,304,294.     Specification of Letters Patent.     Patented May 20, 1919.

Application filed November 12, 1915. Serial No. 61,088.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Double Resonant Circuits, of which the following is a specification.

My invention relates to distributing systems for alternating currents, and it has special reference to distributing systems that are used for transmitting alternating currents of different frequencies.

More particularly, my invention relates to distributing systems in which the separate circuits or paths for the flow of alternating currents of various frequencies are superimposed upon one another, while, at the same time, the transmitting devices or other apparatus, that are designed to be operated or influenced by alternating currents of selected frequencies, are protected from the flow of alternating currents other than those having the proper frequency.

My invention contemplates the use of condensive and inductive reactance elements which are so related and connected to one another that, by properly adjusting their electrical constants, both voltage and current resonant conditions may be established; series-resonant conditions for alternating currents of one frequency and parallel-resonant conditions for alternating currents of another frequency. By utilizing my invention in an alternating-current distributing system upon which alternating - current impulses of different frequencies are impressed, the separate circuits constituting paths for the flow of currents of selected frequencies may be electrically independent of one another while, at the same time, they are superposed upon one another so as to comprise conductors that are common to all of them. It is frequently desirable or necessary to provide means, in electrical distributing systems for alternating currents, whereby alternating currents of a certain definite frequency may flow substantially unimpeded through certain portions thereof, while alternating currents of another frequency are completely precluded from flowing through other portions thereof.

It is well known that, when a condensive reactance element and an inductive reactance element are connected in series relationship and inserted in an alternating-current circuit traversed by an alternating current of definite frequency, the electrical constants of the aforementioned elements may be so adjusted that the condensive reactance is substantially equal and opposite to the inductive reactance. As a consequence thereof, the alternating current may flow through the circuit substantially unimpeded because of the series resonant conditions thus established. Similarly, a condensive reactance element and an inductive reactance element may be connected in parallel relationship in an alternating-current circuit, the electrical constants of said elements being so adjusted that a circulating current may be established in the local circuit comprising the said elements, while no current flows in the remaining portion of the circuit. This may be explained by the fact that the current flowing through the inductive reactance element lags 180 electrical degrees behind the current flowing through the capacity reactance element, the resultant of this current flow being zero. This condition is known as parallel resonance. By properly interconnecting inductive and condensive reactance elements, I provide means whereby series resonance may be established for currents of a predetermined frequency and, at the same time, parallel resonance is established for alternating currents of another predetermined frequency. The device of my invention is susceptible of general application, but I have described several embodiments only thereof which have been found particularly useful in commercial applications.

Figure 2:
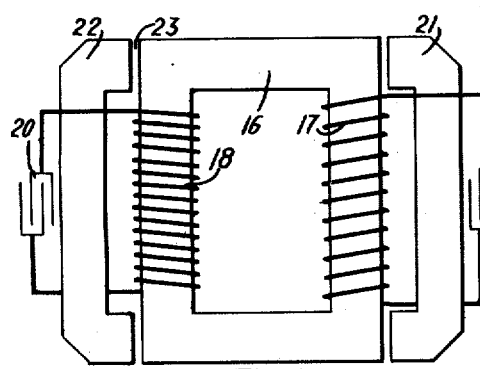
Figure 3:
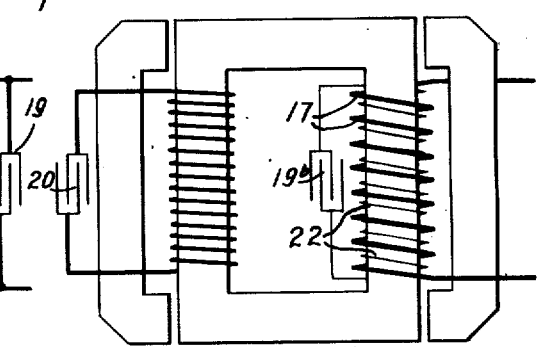
Figure 4:
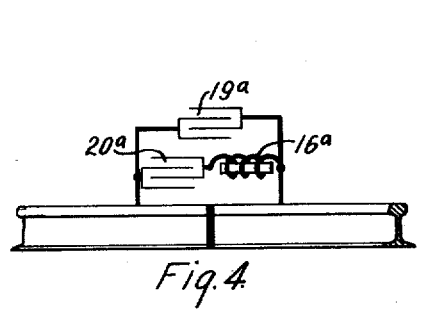
Figure 5:
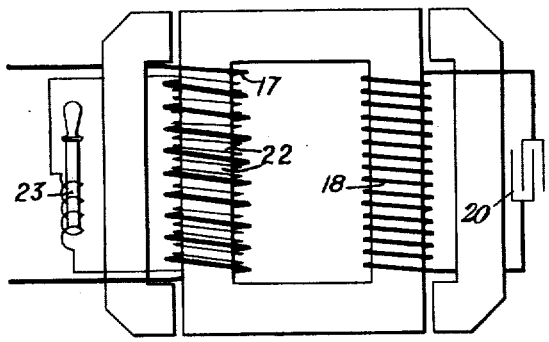
Figure 6:
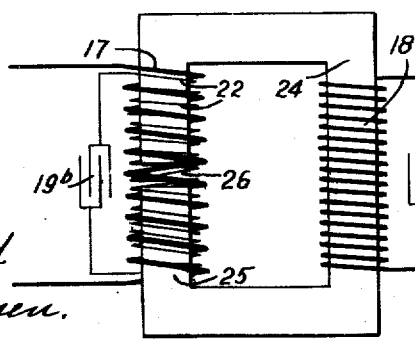
Figure 7:
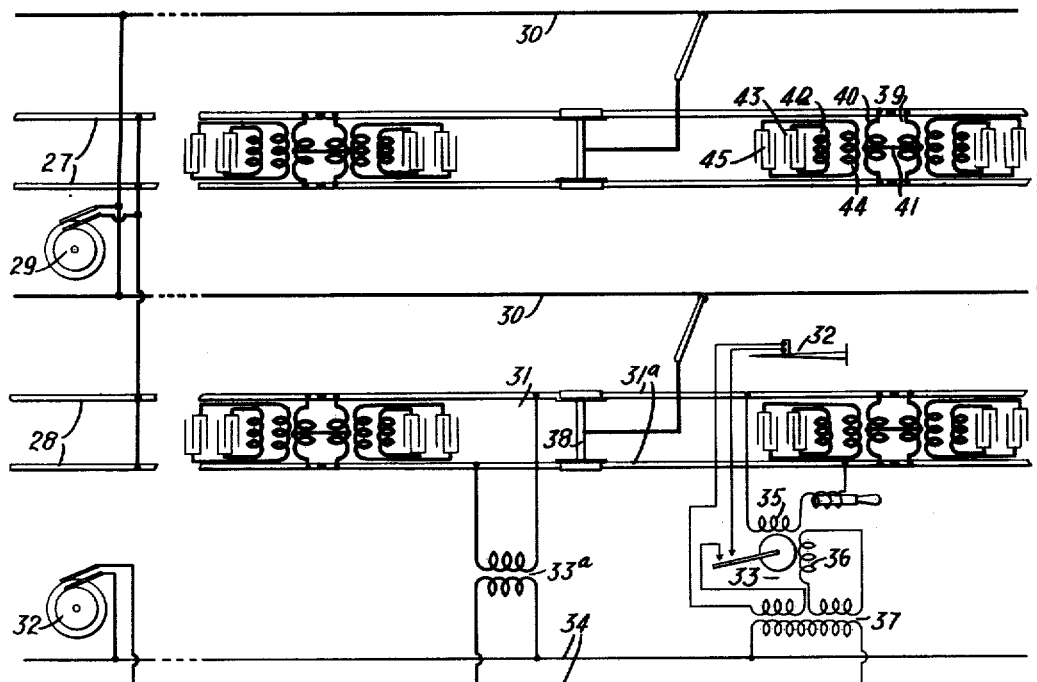
Figures 8, 9:
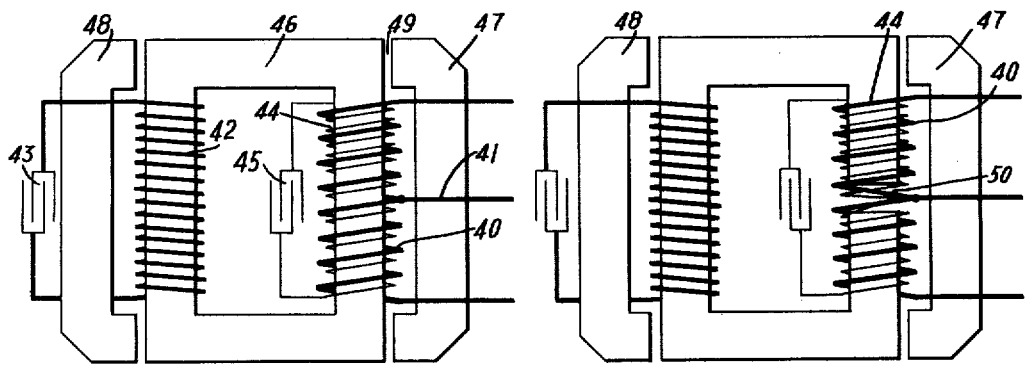
Figure 10:
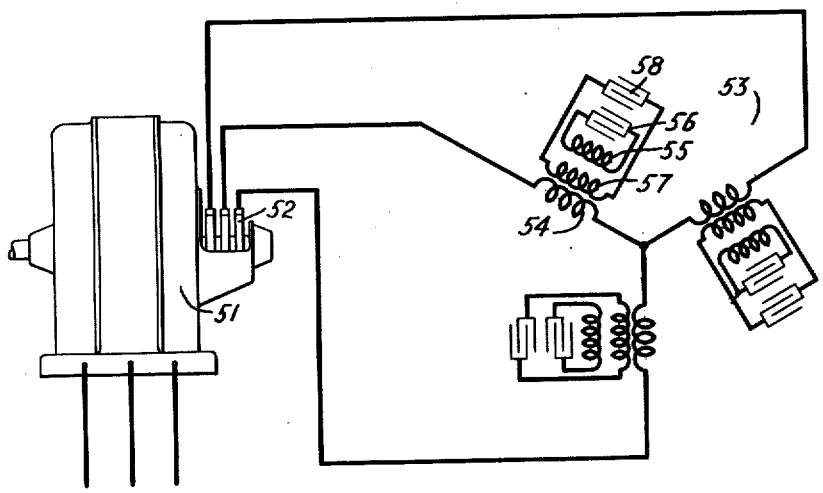

For a better understanding of the nature and scope of my invention, reference may be had to the following description and the accompanying drawings, Figure 1 of which represents a railway system provided with electrical signaling devices of a usual character and operating apparatus therefor built in accordance with my invention; Figs. 2 and 3 are preferred forms of my invention; Fig. 4 is a diagrammatic representation to illustrate the electrical conditions obtaining in the apparatus of Figs. 2 and 3; Fig. 5 is a modified form of a transforming device embodying a form of my invention; Fig. 6 is a modified form of an electrical equivalent of the device shown in Fig. 5; Fig. 7 is an electrical railway system employing impedance bonds built in accordance with my invention; Figs. 8 and 9 are diagrammatic representations of impedance bonds utilizing the principles constituting my invention, and Fig. 10 is a diagrammatic view showing a mode of applying my invention to an induction motor.

Referring to Fig. 1, an electrical railway system, comprising a track 1 consisting of rails 2 and 3, is furnished with propulsion currents from a source of supply shown as a single-phase alternator 4 one terminal of which is connected to a trolley conductor 5 and the other terminal of which is connected to one of the rails 2 and 3. The railway is provided with a signaling system designed to be operated from alternating-current mains 6 that are connected to the tracks 2 and 3 through track transformers 7. The secondary windings 8 of the track transformers 7 are connected across the rails 2 and 3 of the track. Since it is necessary for the propulsion currents to flow substantially unimpeded through the track and, at the same time, to provide insulated block sections for precluding an interchange of the signaling currents between the separate block sections, insulating joints 9 are inserted at intervals in each of the rails. It will be understood that the frequency of the propulsion currents differs from the frequency of the signaling currents furnished by the track transformers 7.

Under normal conditions of operation, a signaling device 10 which, it is presumed, is furnished each block section, indicates safety by reason of the current flow through a relay device 11. When a train bridges the rails 2 and 3, however, the relay device 11 is deënergized, and the signaling device 10 indicates danger or that a train is traversing the associated block section. It is necessary, therefore, to maintain the separate block sections electrically independent of one another and, at the same time, to permit the propulsion currents to flow substantially unimpeded through successive block sections. To accomplish this, each of the insulating joints 9 is shunted by a device 12 of my invention which comprises a condensive reactance element 13 connected in series relationship with an inductive reactance element 14, both of said elements being, in turn, shunted by a second condensive reactance element 15.

To illustrate the operation of my invention, it will be presumed that the frequency of the signaling currents is greater than the frequency of the propulsion currents, it being usual to supply signaling currents from 60 cycle mains and propulsion currents from a 25 cycle source of supply. The reactance elements 13 and 14 have their electrical constants so adjusted with respect to each other that series resonant conditions are established when 25 cycle current traverses the track 1. In this instance, the reactance offered by the condensive element 13 is directly equal and opposite to the reactance afforded by the inductive element 14, the resultant reactance being zero or negligible. When alternating currents of a higher frequency are impressed upon the track, the reactance offered by the inductive element 14 greatly exceeds that offered by the condensive element 13 and, as a result, the circuit which provided resonant conditions for 25 cycle currents acts, in all respects, similar to a highly inductive circuit to the passage of alternating currents of 60 cycles. To completely preclude the flow of 60 cycle currents through the shunt circuits applied to the insulating joints 9, the condensive element 15 is provided which, as above mentioned, is connected in parallel relationship to the circuit comprising the elements 13 and 14. The electrical constants of the condensive element 15 are so adjusted that parallel resonant conditions are established in the local circuit comprising the elements 13, 14 and 15 when 60 cycle electromotive forces are impressed upon the track circuit. Since the resultant current flow through the rails 2 and 3 is negligible because of the parallel resonant conditions established in the aforementioned local circuit, the signaling currents are precluded from flowing between adjacent block sections of the track.

To amplify the above explanation, we may consider that, when the elements 13 and 14 are so adjusted that series-resonant conditions obtain therein to the flow of 25 cycle currents, the electromotive force impressed upon the condensive element 15 is zero. Therefore, the insertion of the condensive element 15 in no way affects the series resonant conditions as regards the 25 cycle currents. Similarly, the elements 13 and 14, when impressed with alternating currents of a higher frequency, such as 60 cycle currents, are equivalent to an inductive reactance element and, by shunting the aforementioned circuit with a condensive element 15, parallel-resonant conditions are established for alternating currents of 60 cycles only. It will be apparent, therefore, that the propulsion currents may flow substantially unimpeded through successive block sections, while the signaling currents are precluded from flowing therebetween, thereby maintaining the signaling circuits electrically independent of one another.

Referring to Fig. 2, I have shown a preferred embodiment of my invention which is an electrical equivalent of the diagrammatic structure shown in Fig. 4. A main magnetizable core member 16, constituting a closed magnetic circuit, is wound with a primary winding 17 and a secondary winding 18. A condensive reactance element 19 is connected in shunt to the primary winding 17, and another condensive reactance element 20 is connected in closed circuit with the secondary winding 18. Magnetizable shunt members 21 and 22 are disposed adjacent to the legs of the core member 16 that are provided with the primary and secondary windings, respectively. It is presumed that the condensive reactance element 20 has a constant capacitance. The reactance of the transformer is so adjusted by varying air gaps 23 between the magnetizable shunt members 21 and 22 and the core member 16 as to establish series-resonant conditions in the primary winding 17 to the flow of alternating currents of a selected frequency; for instance, 25 cycles. The capacity of the condensive reactance element 19 is so chosen that, when 60 cycle electromotive forces are impressed across the primary winding 17, parallel-resonant conditions will obtain therein, thereby precluding the flow of 60 cycle currents in the mains connected to the primary winding 17.

From the above explanation, it will be seen that the condensive element 19 of Fig. 2 corresponds to the condensive element $19^a$ of Fig. 4, and that the condensive element 20 of Fig. 2, in combination with the secondary winding 18, corresponds to the condensive element $20^a$ of Fig. 4. Similarly, the internal reactance of the transformer of Fig. 2 corresponds to that occasioned by an inductive element $16^a$ of Fig. 4.

In Fig. 3, a condensive element $19^b$, which corresponds to the condensive element 19 of Fig. 2, is connected in closed circuit with a secondary winding 22 which is wound upon the same core leg as the primary winding 17 and is closely magnetically linked therewith. The condensive element $19^b$, in combination with its associated secondary winding 22, is an electrical equivalent of the condensive element 19 of Fig. 2, the element $19^b$, however, being of smaller capacity than the element 19. The action of the transformer of Fig. 3 is, in all respects, similar to the transformer of Fig. 2, series-resonant conditions being established in the primary winding 17 when a current of predetermined frequency traverses the same, and parallel-resonant conditions being established therein when an alternating current of another predetermined frequency traverses the same.

When it is desired to establish series-resonant conditions for an alternating current of a high frequency, and parallel-resonant conditions for an alternating current of a low frequency, the inductive-reactance element 23 of Fig. 5 is substituted for condensive element $19^b$, of Fig. 3. By adjusting the internal reactance of the transformer, as mentioned above, series-resonant conditions may be established in the primary winding 17 when an alternating current of a high frequency, such as 60 cycles, traverses the same. When an alternating current of a low frequency, such as 25 cycles, is impressed upon the primary winding 17, the condensive reactance element 20 will predominate and, therefore, it is necessary to provide an inductive reactance element which will exactly counterbalance the effect of the condensive reactance 20. To this end, the inductive element 23 is employed in order to establish parallel resonance in the primary winding 17 when a current of 25 cycles traverses the same.

While I have shown magnetizable shunt members for establishing magnetic leakage between the primary and secondary windings of the transformer, another method of creating an internal reactance in the transformer is to provide an air gap in the main core member such as is shown in Fig. 6. In this instance, the condensive reactance element 20 is connected in closed circuit with the secondary winding 18 which is wound upon a core leg 24 of the core member 16, the core leg 24 being continuous. The primary winding 17 and the secondary winding 22, which are closely magnetically linked to each other, are wound upon a core leg 25 which is provided with an air gap 26. By means of the air gap 26, a large magnetic leakage is established between the primary winding 17 and the secondary winding 18, and, at the same time, the primary winding 17 and the secondary winding 22 are closely magnetically linked. Of course, it will be understood that the width of the air gap 26 may be varied in any well known manner in order to provide adjustable means for varying the value of the internal reactance of the transformer.

My invention may be applied to electrical railway systems in which several tracks are in close proximity to one another. Under such circumstances, the propulsion currents flowing in one track may induce disturbing electromotive forces in an adjacent track which will affect the signaling apparatus associated with each insulated block section thereof. To illustrate this application of my invention, reference may be had to Fig. 7 in which a railway system, comprising a track 27 and a track 28, is furnished with propulsion currents from a source of supply shown as a single-phase alternator 29. Trolley conductors 30 are connected to one terminal of the alternator 29, and the tracks 27 and 28 are connected to the other terminal thereof. The tracks severally comprise a series of insulated block sections which is equipped with electrical signaling apparatus. For the purpose of illustration, I have shown a block section 31 of the track 28 equipped with a signal device 32, the positions of which are varied by a relay device 33 that is influenced by the traffic conditions obtaining upon the block section 31. The signaling currents may be considered as having a frequency of 60 cycles per second and as being furnished from a source shown at 32. A track transformer 33ⁿ connects the rails of the insulated block section 31 to signaling-current mains 34 which parallel the railway system. The winding 35 of the relay 33 is connected across the rails 31ᵃ, and a second winding 36 is connected, through a transformer 37, to the signaling circuit. Under normal conditions, the windings 35 and 36 are energized, thereby permitting the signaling device 32 to indicate that the block 31 is open. When a train 38 bridges the rails 31ᵃ, the winding 35 of the relay is deenergized, thereby causing the signaling device 32 to indicate that a train is traversing the block section 31.

As a result of the propulsion currents flowing in the track 27, unequal electromotive forces may be induced in the rails 31ᵃ of the block section 31, thereby causing a current to flow through the winding 35 of the relay device 33. It is important, therefore, that the rails 31ᵃ be maintained at the same potential, as regards alternating currents of the propulsion frequency, in order to prevent the signaling device 32 from indicating traffic conditions other than those that actually obtain upon the block 31. To this end, the method disclosed in co-pending patent application Serial No. 59,995 filed November 6, 1915, by Lewis W. Chubb and assigned to the Westinghouse Electric & Manufacturing Company may be employed. The method contemplates the use of a series-resonant circuit connected across the rails of a track section that is tuned to the frequency of the disturbing currents, or, in this instance, tuned to a frequency of 25 cycles. The rails are thus maintained at the same potential, as regards alternating currents of the disturbing frequency, while a difference of potential may exist between them, as regards the alternating currents of the signaling current frequency. My present invention, however, provides an impedance bond 39 which comprises a primary winding 40 provided with a tap 41 at its mid-point that is used to interconnect the track sections, as is well known in the art. A secondary winding 42, that is loosely magnetically linked with the primary winding 40, is connected in closed circuit with a condensive reactance element 43. By properly selecting the capacity of the element 43, series resonant conditions may be established in the primary winding 40, as regards alternating currents having the frequency of the propulsion currents. In this manner, the rails 31ᵃ are maintained at the same potential, as regards 25-cycle currents, thereby precluding the flow of 25-cycle currents through the signaling relay. To preclude the flow of signaling currents other than through the winding 35 of the relay 33, a second secondary winding 44 is employed which is closely magnetically linked with the primary winding 40. A second condensive element 45 is connected in closed circuit with the winding 44, and its capacitance is so chosen that parallel-resonant conditions are established in the primary winding 40, as regards alternating currents having the frequency of the signaling currents. In this manner, the signaling currents are precluded from flowing between the two rails of a track section other than through the proper winding of the signaling relay 33.

From the foregoing explanation, it will be apparent that my impedance bond provides series-resonant conditions, as regards alternating-currents of one frequency, namely, 25 cycles, and parallel-resonant conditions, as regards alternating currents of another frequency, such as 60 cycles. At the same time, the propulsion currents are offered an unimpeded path through the primary winding 40.

Referring to Figs. 8 and 9, I have illustrated several preferred forms of my invention as applied to impedance bonds. A closed magnetic circuit is provided by a core member 46 upon one leg of which is wound the primary winding 40 and the secondary winding 44 which, as above mentioned, are closely magnetically linked to each other. The tap 41 is provided at the mid-point of the primary winding substantially as shown, and the secondary winding 44 is connected in closed circuit with the condensive reactance element 45. The secondary winding 42, which is loosely magnetically linked with the primary winding 40, is wound upon another leg of the core member 46 and is connected in closed circuit with the condensive reactance element 43. To provide for the reactance of the transformer, magnetizable shunt members 47 and 48 are provided which bridge the core legs that are wound with the primary winding 40 and the secondary winding 42, respectively. By adjusting air gaps 49 between the magnetizable shunt members 47 and 48 and the core member 46, the reactance of the transformer may be varied at will. Another method of varying the reactance of the transformer is illustrated in Fig. 9 in which an air gap 50 is provided in that core leg which is surrounded by the primary winding 40 and the secondary winding 44. The magnetizable shunt members 47 and 48 may be employed in addition thereto so as to provide a transformer of an adequately high reactance.

My invention may be effectively employed in the secondaries of induction motors in which it is desired to provide a high starting torque. Referring to Fig. 10, an induction motor, represented at 51 and having a wound stator of the usual type and a wound rotor, is provided with slip rings 52 by means of which connection may be made between the winding of the rotor and an external circuit 53. The external circuit 53 comprises a plurality of primary windings 54 which are connected in Y-formation. A secondary winding 55 is associated with each primary winding 54 and is loosely magnetically linked therewith, as hereinbefore explained. A condensive reactance element 56 is connected in closed circuit with the secondary winding 55. A second secondary winding 57, closely magnetically linked with the primary winding 54, is connected in closed circuit with a condensive reactance element 58. Inasmuch as it is desired to provide a high starting torque, the values of the capacities of the condensers 56 and 58 are so chosen that, at starting or at a frequency of the line currents, the impedance afforded by the primary windings 54 correspond to that afforded by a high non-inductive resistance element. This is accomplished by establishing parallel resonant conditions in the primary winding 54 at the desired frequency when starting the motor. When the motor has been brought up to speed, it is essential for efficient operation to disconnect the high resistance from the rotor windings, and this is automatically effected by establishing series-resonant conditions in the primary winding 54 when the motor is brought up to speed. For instance, the frequency of the currents flowing in the secondary winding or rotor of the motor, when operating at full speed, may be 12 to 13 cycles per second and, therefore, it is essential to establish series-resonance conditions in the primary winding 54 when a frequency of 12 cycles is impressed thereupon. In this manner, the impedance afforded by the winding 54 is automatically eliminated.

While I have shown several embodiments of my invention, it will be apparent to those skilled in the art that additional modifications may be made without departing from the spirit and scope of the appended claims.

I claim as my invention:

1. The combination with a circuit constituting a series-resonant path for alternating-current impulses having a certain frequency, of a second circuit connected in parallel relationship therewith whereby a parallel-resonant path is established for alternating-current impulses of another frequency.

2. In an electrical distributing system upon which a plurality of alternating-current impulses of different frequencies are impressed, the combination with an auxiliary circuit which constitutes a series-resonant path for alternating currents of one frequency, of a second circuit connected in parallel relationship with said auxiliary circuit whereby a parallel-resonant path for alternating currents of another frequency is established.

3. In an electrical distributing system comprising two conductors upon which alternating-current impulses of different frequencies are impressed, the combination with an auxiliary circuit whereby the potential of the two conductors may be maintained equal, as regards alternating-current impulses of a certain frequency only, of a second circuit connected in parallel relationship with said first circuit whereby a parallel-resonant path is established for alternating currents of another frequency.

4. A rail bond for a railway signaling system comprising, in combination, a circuit which constitutes a series-resonant path for alternating currents of a certain frequency, and a second circuit in parallel relationship therewith whereby a parallel-resonant path is established for alternating currents of another frequency.

5. A rail bond for a railway signaling system comprising, in combination, a circuit which constitutes a series-resonant path for alternating currents having the frequency of the propulsion currents, and a second circuit in parallel relationship therewith whereby a resonant path is established for alternating currents having the frequency of the signaling currents.

6. A rail bond for a signaling system of a railway using alternating propulsion and signaling currents, comprising a series-resonant circuit which offers a path for the free flow of the propulsion currents, and additional means associated with the series-resonant circuit which precludes the flow therethrough of the signaling currents.

7. In an electrical railway the track of which constitutes a return path for the propulsion currents and comprises the circuit for the signaling currents, the combination with a plurality of block sections formed by insulating joints in the rails, of rail bonds interconnecting said block sections to one another, said rail bonds constituting series-resonant paths for alternating currents having the frequency of the propulsion currents and parallel resonant paths for alternating current having the frequency of the signaling currents.

8. An electrical apparatus comprising a main core member, a primary winding thereof, a secondary winding loosely magnetically linked with said primary winding, a condensive reactance element connected in closed circuit with said secondary winding, an additional secondary winding closely magnetically linked with said primary winding, and a condensive-reactance element connected in circuit with said additional secondary winding.

9. An electrical apparatus comprising a main core member, a primary winding thereof, a secondary winding, a condensive reactance element connected in closed circuit with said secondary winding, an additional secondary winding closely magnetically linked with said primary winding, a condensive-reactance element connected in circuit with said additional secondary winding, and means for establishing a magnetic leakage between said primary winding and said first secondary winding only.

10. An electrical apparatus comprising a main core member, a primary winding thereof, means for establishing series-resonant conditions in the primary winding, as regards alternating currents of one frequency, and additional means for establishing parallel-resonant conditions therein, as regards alternating currents of another frequency.

11. An impedance bond for electric railway systems the tracks of which constitute a plurality of insulated track sections comprising a core member, a primary winding therefor having terminals adapted for connection to the two rails of a track, and a tap at its mid-point for interconnecting the block sections to one another, a secondary winding, a condensive reactance element connected in closed circuit therewith, means whereby series-resonant conditions may be established in said primary winding, as regards alternating currents of a certain frequency, a second secondary winding closely magnetically linked with the primary winding, and a condensive-reactance element connected in circuit with second secondary winding whereby parallel-resonant conditions may be established in the primary winding, as regards alternating currents of another frequency.

In testimony whereof, I have hereunto subscribed my name this 26th day of Oct., 1915.

CHARLES LE G. FORTESCUE.